Nov. 29, 1960   R. F. SIMBULAN   2,962,105
INDUSTRIAL TOW TRACTOR

Filed Jan. 24, 1958   4 Sheets-Sheet 1

INVENTOR.
RAYMOND F. SIMBULAN
BY
ATTY.

Nov. 29, 1960

R. F. SIMBULAN 2,962,105

INDUSTRIAL TOW TRACTOR

Filed Jan. 24, 1958

INVENTOR.
RAYMOND F. SIMBULAN
BY *J. C. Wiessler*
ATTY.

Nov. 29, 1960 R. F. SIMBULAN 2,962,105
INDUSTRIAL TOW TRACTOR
Filed Jan. 24, 1958 4 Sheets-Sheet 3
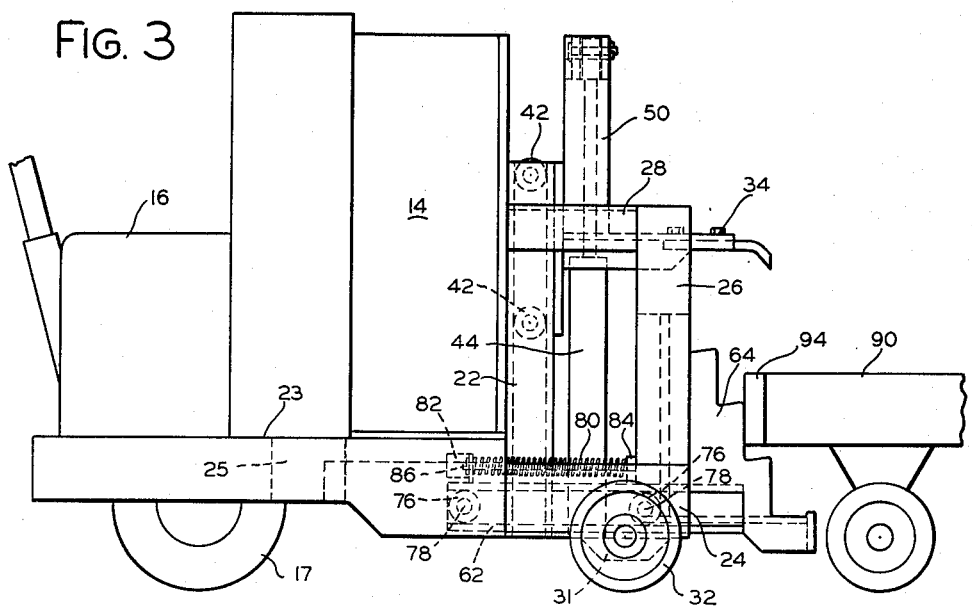
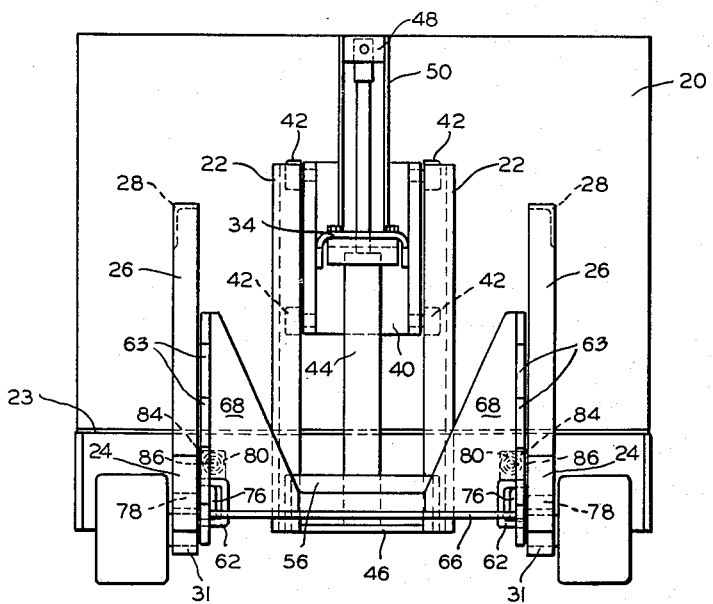
INVENTOR.
RAYMOND F. SIMBULAN
BY
ATTY.

Nov. 29, 1960     R. F. SIMBULAN     2,962,105
INDUSTRIAL TOW TRACTOR

Filed Jan. 24, 1958     4 Sheets-Sheet 4

INVENTOR.
RAYMOND F. SIMBULAN
BY
ATTY.

United States Patent Office 2,962,105
Patented Nov. 29, 1960

2,962,105
INDUSTRIAL TOW TRACTOR

Raymond F. Simbulan, Battle Creek, Mich., assignor to Clark Equipment Company, a corporation of Michigan Filed Jan. 24, 1958, Ser. No. 711,035
17 Claims. (Cl. 180—13)

This invention relates to industrial tow tractors, and more particularly to improvements in industrial tow tractors of a type particularly well suited, for example, to the hauling of non-self-propelled four wheel carts or trailers, hereinafter sometimes referred to as "live skids."

Tow tractors of various kinds have long been used in industry for the purpose of hauling material carrying trains of live skids from one location to another. Heretofore it has been generally necessary for the tractor operator to dismount from the tractor, in the case of rider type tractors, or to walk to the coupling end of the tractor, in the case of hand or "walkie" type tractors, for the purpose of manually coupling to or uncoupling from the tractor one or a train of live skids or trailers. It has also been generally necessary heretofore to provide special manually operated mechanism of a type which permitted the operator to engage at different times trailers of different heights.

My invention, in addition to providing a generally improved tractor construction of the type contemplated, utilizes an extremely novel and simple constructional arrangement which eliminates the necessity for both of the above referred to manual operations.

It is therefore a primary object of this invention to provide in a tow tractor a novel constructional combination which eliminates the necessity for manually coupling thereto and uncoupling therefrom trailer units. In other words, trailer units, such as live skids, may be automatically coupled to and uncoupled from my tractor.

It is another important object of this invention to provide a tractor of the type contemplated which is inherently capable of automatically attaching itself to or disengaging itself from trailer units of various heights.

A further object of this invention is to provide in such tractor units a generally improved and simplified construction for performing trailer coupling and hauling operations.

The foregoing and other objects and advantages will become apparent in view of the following description taken in conjunction with the appended drawings, in which:

Figure 3 is a side elevational view of the tractor unit shown in Figure 1 in combination with a live skid of different height than that shown in Figure 1 and about to be coupled thereto;

Figure 4 is a front elevational view of the coupling end of the tractor unit shown in Figure 3.

Figure 1:
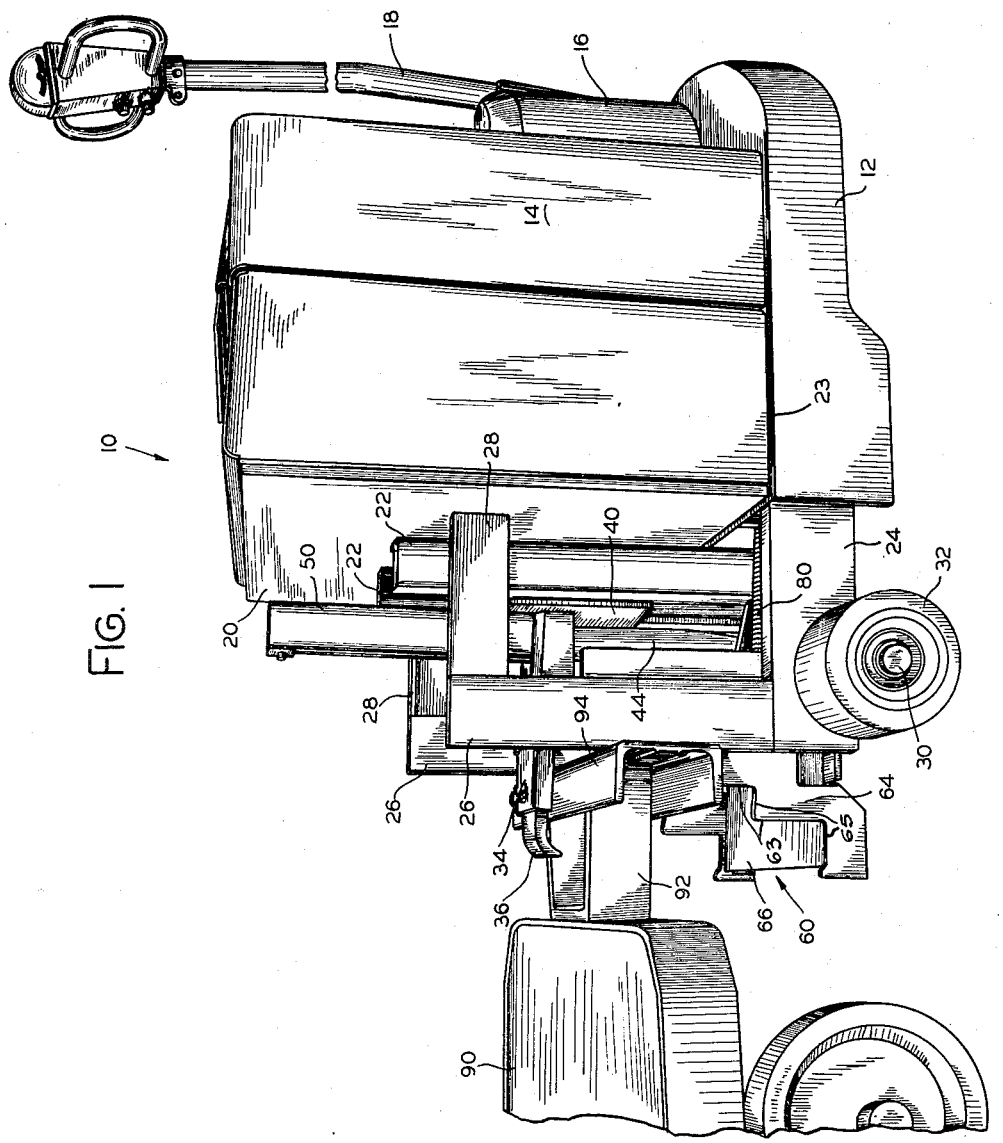
Figure 1 is a side perspective view of a tow tractor utilizing my invention and shown in coupled relationship to a live skid.

Referring now in greater detail to the drawings, a tractor unit is indicated generally at numeral 10 and comprises a main frame 12 upon which is supported in a body housing 14 a battery, not shown, which functions as the source of energy for a drive motor 16 mounted immediately above a steering driving wheel 17 (Figure 3) to which is operably connected in a well-known manner a steering and motor control handle 18. Electric motor means, hydraulic pump means, a sump tank, control circuitry for the pump and motors and other operating components may also be housed within body housing 14. The power head end of the tractor unit, as above described, is well-known in the art and need not be further amplified herein since it forms no part of the present invention.

Although a "walkie" type tow tractor is herein illustrated, my invention may also be adapted for use with rider type tractors.

The front or coupling end of the tractor unit comprises a constructional arrangement which is the subject of the present invention. Housing 14 is enclosed at the front end thereof by a vertically extending plate member 20. Rigidly attached to the forward surface of said plate member is a pair of transversely spaced and vertically extending channel members 22. Extending forwardly from the open main frame assembly 12 and rigidly connected to the underside of a main frame base plate member 23 by a pair of laterally spaced brackets 25 which depend downwardly from plate member 23 is a pair of longitudinally extending and transversely spaced coupling frame members 24. A pair of vertically extending coupling frame or stop members 26 is secured to the forward upper edge portions of members 24, and a pair of rearwardly extending angle frame members 28 is rigidly connected between the upper ends of members 26 and plate member 20. Rotatably mounted upon a pair of axially aligned stub axles 30, which are suitably connected to bracket members 31 which depend downwardly from forward portions of members 24, is a pair of trail wheels 32 which, with the steering driving wheel 17, normally provide three point rolling support for the tractor unit 10.

An upper clamping jaw member 34, which consists of a forwardly extending channel shaped element having a downwardly hook shaped member 36 bolted thereto and a cut-out portion 38, is supported for vertical movement relative to channel members 22 by means of a fabricated U-shaped bracket assembly 40 mounted for vertical movement between the channel members 22 and connected for rolling engagement therewith by means of two pairs of vertically spaced rollers 42 connected to the legs of the U-shaped assembly 40. An hydraulic cylinder and piston assembly 44 is secured at the cylinder or lower end to a fixed plate member 46 which is secured between channel members 22, the piston rod end of said assembly being movably connected to the uppermost portion of a vertically extending bracket assembly 48. The bracket assembly 48 consists of a vertically extending channel member 50 secured along the lower portion of the base thereof to the forward surface of the base of U-shaped bracket assembly 40, and a pin member 52 to which is secured the piston rod end of cylinder assembly 44. A generally V-shaped strengthening member 56 is secured between the lower ends of channel members 22 to avoid any tendency of said lower ends to spread during operation.

Figure 2:
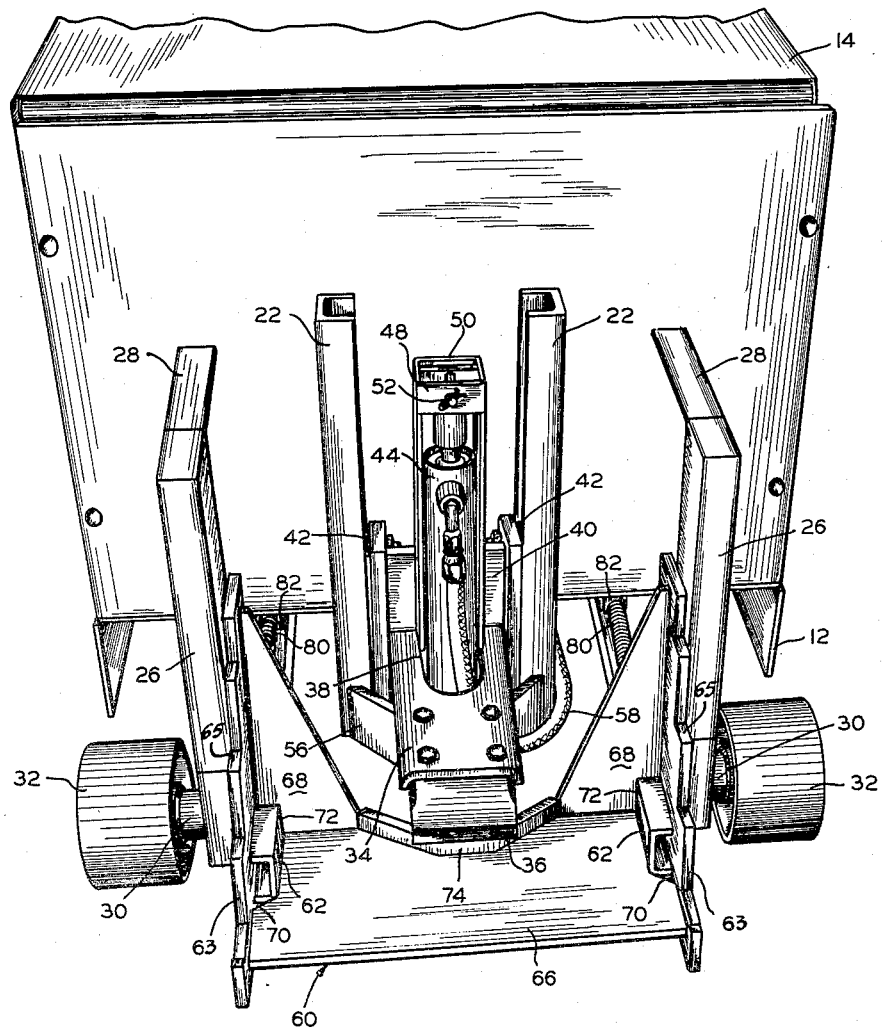
Figure 2 is a top front perspective view of the tractor unit shown in Figure 1.

The cylinder and piston assembly is preferably double acting so as to be positively actuatable in either direction. One of the hydraulic conduits connected to the cylinder is shown at numeral 58 (Figure 2). The upper jaw assembly 34 is actuatable upwardly or downwardly in channels 22 whenever the cylinder assembly 44 is pressurized at one or the other ends thereof. If the jaw assembly is actuated upwardly, the piston rod carries U-shaped bracket assembly 40, bracket assembly 48 and the clamping jaw upwardly therewith, the cut-out section 38 of the jaw member permitting same to clear the cylinder member. The desired extent of vertical movement may be controlled either by the effective length of the cylinder or by suitable stop means, not shown, associatable with channel members 22. The upper clamping jaw assembly is illustrated in its lowermost position in Figure 2, in an intermediate position in Figure 1, and in its upper position in Figures 3 and 4.

A lower clamping jaw assembly is indicated generally at numeral 60 and comprises a pair of transversely spaced, outwardly facing and longitudinally extending channel members 62, to the forward leg portions of which is secured, as by welding, a pair of similarly spaced jaw members 64, each of which jaw members includes a plurality of upwardly and rearwardly progressing notched or step portions, as shown. Each notched portion comprises an abutment surface 63 and a clamping surface 65 for a purpose to be described. For each pair of such abutment and clamping surfaces, the abutment surface comprises the riser portion and the clamping surface the tread portion of a step. Horizontally and vertically extending strengthening plate members 66 and 68 are secured to each other and to the pair of notched members 64, said plate members including suitably cut-out portions 70 and 72 (Figure 2) which permit channel members 62 to extend to a position adjacent the forward end portions of members 64. Vertical plate members 68 are generally triangular in shape, and lower corresponding vertices thereof are connected by a generally V-shaped strengthening member 74.

A plurality of inwardly disposed roller members 76 are mounted for rotation on stub shafts 78 to opposite ones of coupling frame members 24 in longitudinally spaced pairs. Channel members 62 are spaced so as to be registrable with the pairs of rollers 76 for longitudinal movement relative to the tractor.

Figure 5:
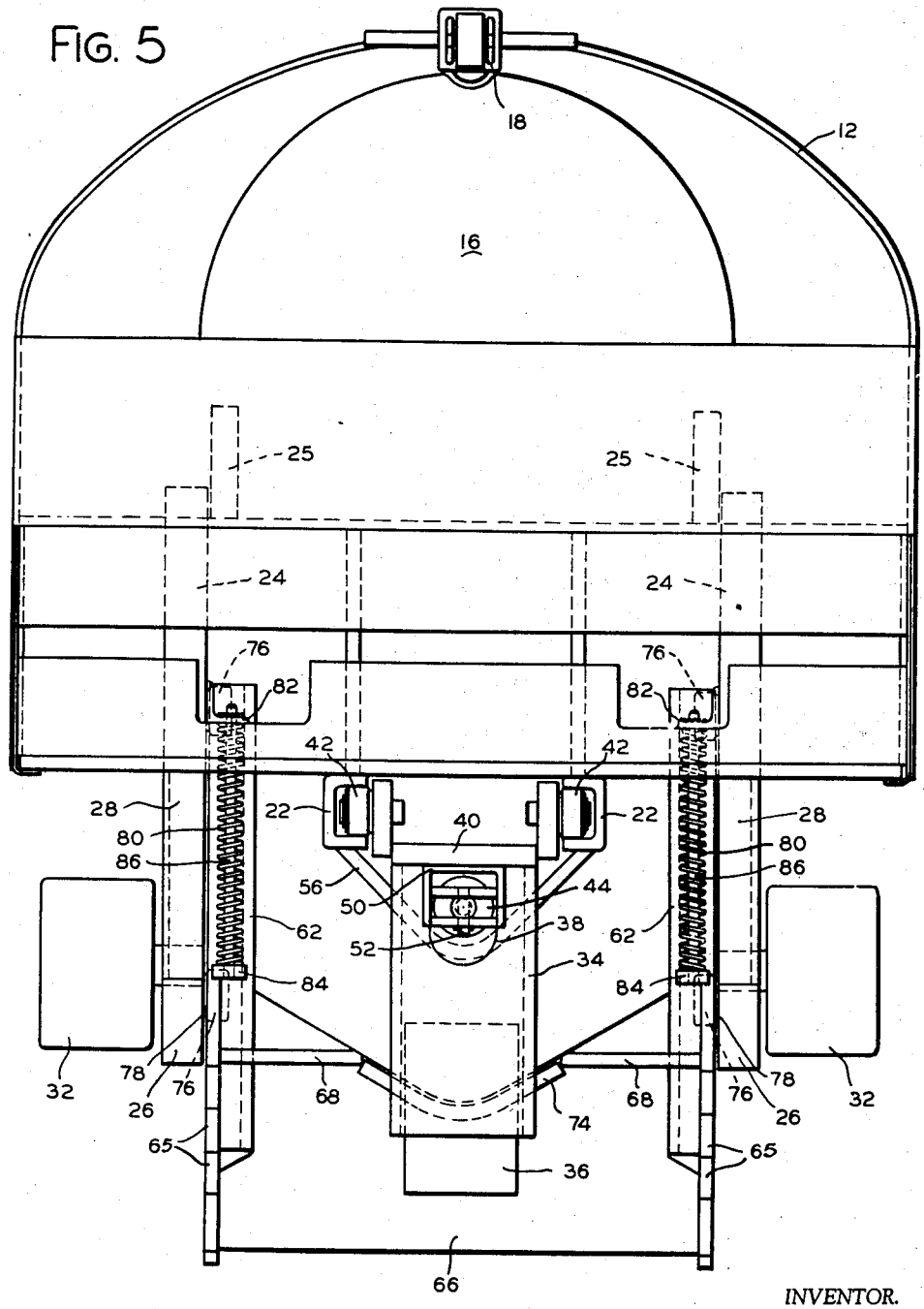
Figure 5 is an enlarged plan view of the tractor unit shown in Figure 3.

A pair of transversely spaced compression spring members 80 is mounted between respective pairs of inwardly extending angle bracket members 82 (secured to the inner surfaces of the rear portions of fixed frame members 24) and upwardly extending bracket members 84 (secured to the upper surfaces of the intermediate portions of channel members 62). A guide rod 86 is fixed to and extends longitudinally rearwardly of each bracket member 84 through the open center of each spring 80 and an opening provided in each bracket member 82. The compression springs 80 urge the entire lower clamping jaw assembly 60 forwardly of the tractor unit to the extended position which is shown in Figures 2 and 5.

The forward portion of a wheeled trailer or live skid is indicated at numeral 90; the skid includes a forwardly extending U-shaped hitch member 92 to the forward end of which is secured a transversely extending channel member 94.

In operation, the tractor unit 10 may be maneuvered to any desired location adjacent the front end of a trailer 90, which may be the front unit of a coupled train of live skids. Depending on the height of a trailer 90, the upper clamping jaw 34 is actuated to a high or intermediate position in channels 22 so that the tractor unit may be maneuvered into position, as shown in Figure 3, without interference between jaw 34 and the trailer hitch assembly 92, 94. The height of the trailer hitch assembly will determine, of course, which of the surfaces 63 of the steps formed in plate members 64 will be moved into abutment with trailer hitch member 94.

As the tractor is moved toward the trailer unit, channel member 94 and a surface 63 come into abutment, whereupon continued forward movement of the tractor causes the entire lower jaw assembly 60 to be actuated rearwardly of the tractor on rollers 76, thereby causing the springs 80 to be compressed between the pairs of brackets 82 and 84 as the guide rods 86 are actuated rearwardly with the jaw assembly through the openings provided in brackets 82. Rearward movement of the jaw assembly continues until channel member 94 moves into abutment with the forward vertical edges of frame or stop members 26, following which cylinder and piston assembly 44 is pressurized to actuate upper jaw 34 downwardly and into engagement with the upper leg of channel 94.

The clamping surfaces 65 of the steps formed in plate members 64 are so located that the hitch assemblies of various standard height trailer units will clear same by a small amount, as best shown in Figure 3. The purpose of this design is to permit the trail wheels 32 to be lifted clear of the floor or other supporting surface as when a hitch has been effected and pressurization of the cylinder assembly 44 is continued to force the entire tractor unit 10 to pivot upwardly at the forward end thereof about the driving steering wheel 17 until the adjacent clamping surfaces of plate members 64 come into abutment with the lower leg of channel 94. When the trailer is thus coupled to the tractor unit it will be seen that a single rigid tractor-trailer combination results, which combination has five point rolling contact with the floor (where a four wheeled trailer is involved). For efficient operation in the above noted manner two of the trailer wheels should be caster wheels.

To uncouple the trailer from the tractor unit it is merely necessary to energize the cylinder assembly in a direction to raise jaw assembly 34, which permits the tractor unit to tip forwardly so that the trail wheels 32 again engage the floor, following which the tractor unit may be moved away from the trailer. As the tractor is so moved the compression springs 80 urge the lower clamping jaw 60 forwardly of the tractor to the position illustrated in Figures 2 and 5, in which position the lower jaw assembly is again ready to be automatically coupled with a trailer unit.

From the above it will be now apparent that my invention provides a compact, relatively simple and improved design of tractor unit of the type described which is inherently adjusted to automatically handle trailers of various heights, which design eliminates the necessity for manual coupling and uncoupling operations, and which provides for five point rolling contact with the floor or other supporting surface when the tractor unit is properly rigidly coupled to a four wheel trailer.

While I have described a particular embodiment of my invention for the purpose of illustration it should be understood that various modifications thereof may be made within the spirit of the invention as set forth in the claims.

I claim:

1. In a wheeled tractor for towing trailers in coupled relation thereto comprising a frame, a prime mover and steering means associated therewith at one end thereof and laterally spaced wheel means supporting the opposite end thereof, an upper clamping jaw assembly mounted for vertical guided movement adjacent the said opposite end of the tractor, means supporting said jaw assembly and energizable to actuate same vertically in either direction, and a lower clamping jaw assembly mounted upon said frame for longitudinal movement relative thereto including a pair of laterally spaced and vertically extending notched plate members, a framework connecting said plate members, yielding means effectively connected between a portion of the tractor frame and said lower clamping jaw assembly for urging said latter assembly longitudinally outwardly of the said opposite end of the tractor, and means associated with said opposite end for limiting movement of a trailer toward the tractor with the lower jaw assembly and in opposition to the yielding means.

2. In a wheeled tractor for towing trailers in coupled relation thereto comprising a frame supported by a plurality of wheels and prime mover and steering means associated with one end thereof, trailer coupling means operatively connected to the frame adjacent the opposite end thereof comprising an upwardly and downwardly actuatable upper clamping jaw assembly, and a horizontally actuatable lower clamping jaw assembly cooperable with the upper jaw assembly to rigidly couple hitching means of trailer units therebetween, said lower jaw assembly including a pair of laterally spaced and vertically extending plate members, guide means connecting said plate members to the frame so as to permit horizontal movement thereof in either direction relative to the frame, resilient means operatively connected between a portion of the frame and said plate members for urging the plate members longitudinally outwardly of said opposite end of the tractor, and means associated with said opposite end for limiting movement of a trailer toward the tractor with the lower jaw assembly and in opposition to the yielding means.

3. A tow tractor as claimed in claim 2 wherein the upper jaw assembly is mounted for upward and downward movement intermediate said pair of plate members, and said plate members are movable simultaneously inwardly of the tractor in opposition to said resilient means when a hitch of trailer means is brought forcibly into abutment with said plate members, said upper jaw assembly being thereafter actuatable downwardly to rigidly engage the trailer hitch between the upper and lower jaw assemblies.

4. A wheeled tow tractor having a generally vertically extending end, vertically extending guide means attached to said end, an upper jaw assembly mounted in the guide means for vertical movement and extending forwardly of said end, laterally spaced coupling frame means connected to and extending forwardly of said end, a pair of laterally spaced wheels mounted adjacent said end of the coupling frame for normally supporting one end of the tractor, a pair of laterally spaced and vertically extending plate members mounted for movement longitudinally of the tractor and normally extending forwardly of said coupling frame, said plate members including abutting and clamping surfaces associated therewith, compression spring means urging said plate members forwardly of said coupling frame, said spring means being compressed when said plate members are moved into abutment with trailer means such that the plate members are actuated longitudinally of the tractor, and stop means associated with said vertically extending end for limiting such longitudinal movement of the trailer means.

5. A wheeled tow tractor having a generally vertically extending end, an upper jaw assembly extending forwardly of and connected to said end and mounted for upward and downward movement, laterally spaced coupling frame means connected to and extending forwardly of said end, vertically extending plate means mounted for movement longitudinally of the tractor and including abutting and clamping surfaces associated therewith, and means associated with said plate means providing a normal position of the plate means forwardly of the coupling frame, said coupling frame including vertically extending fixed stop means, an abutting surface of said plate means being engageable by a portion of a trailer unit and movable rearwardly of the tractor from said normal position until a trailer portion abuts said stop means, following which the upper jaw assembly may be actuated downwardly to engage a portion of the trailer between the upper jaw assembly and a clamping surface of said plate means.

6. In a tow tractor having a main frame and a prime mover and steering means associated therewith at one end thereof, a vertically extending coupling frame connected to the main frame and projecting forwardly thereof, a pair of laterally spaced trail wheels connected to the coupling frame, and upper and lower coupling means mounted intermediate the sides of the coupling frame, said upper clamping means including vertical guide means connected to the main frame, a forwardly extending jaw assembly mounted in said guide means and a hydraulic actuator supported by the main frame and connected to the jaw assembly for actuating the latter vertically in either direction relative to said guide means, and said lower jaw assembly including a forwardly extending plate member providing abutting and clamping surfaces, means connecting said plate member to the coupling frame for guided longitudinal movement relative thereto, means for urging said plate member to a position forwardly of the coupling frame, the abutting surface of said plate member being forcibly engageable with trailer means for actuating the plate member rearwardly in opposition to said urging means, and means associated with said coupling frame for limiting such rearward movement of the trailer means and plate member, said upper jaw assembly being actuatable downwardly to rigidly clamp a portion of the trailer means between the upper jaw assembly and the clamping surface of said plate member.

7. A tow tractor comprising a coupling frame associated with one end thereof, upper clamping jaw means attached to the tractor for upward and downward movement relative thereto, and independently movable lower clamping jaw means associated with the coupling frame for longitudinal guided movement relative thereto, said lower jaw means being constructed and arranged for abutting engagement with trailer means and movable longitudinally of the coupling frame into coupling position relative to said upper jaw means following such abutment and under the force imposed by such trailer means on the lower jaw means, and means associated with the coupling frame for limiting such longitudinal movement to establish such coupling position, whereupon said upper jaw means is actuatable downwardly for clamping the trailer means between the upper and lower jaw means.

8. A tow tractor as claimed in claim 7 wherein the lower jaw means includes a plurality of pairs of abutting and clamping surfaces in the one end thereof, each pair of such surfaces being arranged as the riser and tread portions of a step and being cooperable with the upper jaw means to engage and clamp therebetween trailer means of a given height.

9. A tow tractor comprising a coupling frame having stop means associated with one end thereof, upwardly and downwardly movable upper clamping jaw means attached to the tractor, lower clamping jaw means associated with the coupling frame for longitudinal guided movement relative thereto, said lower jaw means being movable longitudinally rearwardly of the coupling frame following abutting engagement thereof with trailer means, the extent of such longitudinal rearward movement being limited by said stop means, said upper jaw means being actuatable downwardly for clamping the trailer means between the upper and lower jaw means when the trailer means is positioned in abutting relation to the stop means.

10. A tow tractor for handling trailers and the like comprising a coupling frame associated with one end thereof, movable upper clamping means attached to the tractor for engaging a trailer coupling member, lower clamping means mounted for longitudinal guided movement relative to the coupling frame and constructed for abutting engagement with a trailer, stop means located on the coupling frame, said lower clamping means being movable longitudinally inwardly of the tractor following abutment thereof with the trailer means until a portion of the trailer means moves into abutment with said stop means, whereupon said upper clamping means is actuatable downwardly for clamping the trailer between the upper and lower clamping means.

11. A tow tractor as claimed in claim 10 wherein the lower clamping means includes a vertical plate means having pairs of abutting and clamping surfaces in the outer end thereof, each pair of such surfaces being arranged as the riser and tread portions of a step, said trailer means being abuttable with the riser portion for actuating the plate means longitudinally of the tractor until said portion of the trailer abuts the stop means, whereupon the upper clamping means is actuatable for clamping the trailer means between itself and a tread portion of the plate means.

12. A wheeled tractor for towing trailers in coupled relation thereto comprising a coupling frame associated with one end of the tractor which includes trailer abutment means, upwardly and downwardly movable upper clamping means connected to the tractor, and lower clamping means movable longitudinally of the coupling frame and in vertically spaced relation from the upper clamping means, said lower clamping means being constructed for moving engagement with a trailer until the trailer is in abutment with the stop means.

13. A tractor as claimed in claim 12 wherein said lower clamping means includes vertically ascending step portions the riser sections of which are abuttable with trailers of different heights and the tread portions of which provide lower clamping surfaces, the latter together with the upper clamping means being adapted to hold a trailer in rigid coupled relation with the tractor following longitudinal movement of the lower clamping means into a position wherein the trailer abuts said stop means.

14. A wheeled tractor for towing trailers in coupled relation thereto comprising upwardly and downwardly movable upper jaw means connected at one end of the trailer, inwardly and outwardly movable lower jaw means mounted adjacent said one end of the tractor and spaced beneath the upper jaw means, inward movement of the lower jaw means being effected by moving said one end of the tractor into forceful abutment with a trailer portion, and stop means connected to said one end of the tractor for limiting the movement of the trailer longitudinally toward the tractor following abutment of the trailer and lower jaw means.

15. A tractor as claimed in claim 14 wherein the stop means comprise a pair of laterally spaced and vertically extending members connected to said one end of the tractor, and the lower jaw means comprises a pair of laterally spaced and vertically extending plate members each of which includes corresponding abutting and clamping surfaces, said abutting surfaces being engageable with trailers of different heights for actuating the lower jaw means inwardly until the trailer abuts the stop means, whereupon the trailer is positioned for rigid coupling with the tractor between the upper jaw means and one of the clamping surfaces of the lower jaw means.

16. A tractor as claimed in claim 14 wherein means are provided for continuously inducing longitudinal outward movement of the lower jaw means.

17. A tractor as claimed in claim 15 wherein resilient means is provided which urges the lower jaw means longitudinally outwardly of the said one end of the tractor, said lower jaw means being moved inwardly of the tractor in opposition to the resilient means by the trailer to be coupled therewith.

References Cited in the file of this patent
UNITED STATES PATENTS

| | | |
|---|---|---|
| 2,669,314 | Quayle | Feb. 16, 1954 |
| 2,807,382 | Schenkelberger | Sept. 24, 1957 |
| 2,878,884 | Schreck | Mar. 24, 1959 |